US012778218B2

(12) United States Patent
Seiner

(10) Patent No.: US 12,778,218 B2
(45) Date of Patent: Nov. 3, 2026

(54) ARTICLE OF APPAREL WITH INTEGRATED HARNESS FOR LIFT ASSISTANCE

(71) Applicant: Mia Gabrielle Seiner, Portland, OR (US)

(72) Inventor: Mia Gabrielle Seiner, Portland, OR (US)

( * ) Notice: Subject to any disclaimer, the term of this patent is extended or adjusted under 35 U.S.C. 154(b) by 0 days.

(21) Appl. No.: 19/076,879

(22) Filed: Mar. 11, 2025

(65) Prior Publication Data

US 2026/0272069 A1 Sep. 17, 2026

(51) Int. Cl.
*A41D 3/02* (2006.01)
*A41D 27/00* (2006.01)
*A62B 35/00* (2006.01)

(52) U.S. Cl.
CPC ............... *A41D 3/02* (2013.01); *A41D 27/00* (2013.01); *A62B 35/0025* (2013.01)

(58) Field of Classification Search
USPC ............................................................... 2/93
See application file for complete search history.

(56) References Cited

U.S. PATENT DOCUMENTS 5,466,214 A * 11/1995 Calderon-Garciduenas ................ A61F 5/026 602/19
6,122,778 A * 9/2000 Cohen ................ A62B 35/0006 5/81.1 R
6,128,782 A * 10/2000 Young ................ A62B 35/0018 244/151 R
8,656,516 B1 * 2/2014 Reinhardt Rawlings .................... A41D 11/00 2/69
10,420,689 B1 * 9/2019 Foster ................ A41D 13/0007
2010/0011490 A1 * 1/2010 Stinson ............. A41D 13/0007 2/310
2011/0030119 A1 * 2/2011 Fee ...................... A62B 17/003 2/243.1
2014/0263517 A1 * 9/2014 Redli ................. A41D 13/0007 224/576
2021/0129956 A1 * 5/2021 Cohen ...................... A41F 9/005
2022/0061416 A1 * 3/2022 Zeppetella ......... A41D 13/0007
2022/0111941 A1 * 4/2022 Hornbaker ......... A41D 13/0125

* cited by examiner

*Primary Examiner* — Matthew R Marchewka
(74) *Attorney, Agent, or Firm* — Klarquist Sparkman, LLP

(57) ABSTRACT

An article of apparel, specifically a ski jacket, integrates a harness system that includes a rear strap that can function as a handle. The harness components can be secured to the jacket using reinforced stitching and/or additional fabric panels for durability. Variations of the system can include cross straps for added stability and loop straps for alternative support configurations.

9 Claims, 10 Drawing Sheets

ARTICLE OF APPAREL WITH INTEGRATED HARNESS FOR LIFT ASSISTANCE

FIELD

The present disclosure relates to apparel and, in particular, to an article of apparel with an integrated harness.

BACKGROUND

In recent years, the popularity of skiing among young children has increased significantly. However, ski lift systems have not evolved to accommodate the specific needs of younger, shorter individuals, making the process challenging for them to independently board and disembark from ski lifts. This often necessitates parental assistance, which can be cumbersome and inconvenient. Traditionally, parents have resorted to using separate devices worn over ski jackets to facilitate lifting their children onto and off the lifts. This approach requires the purchase of additional equipment, adding to the cost and complexity of preparing for a ski outing.

Existing solutions lack integration and convenience, as they require multiple products to achieve the desired functionality. The need for a more streamlined solution is evident, one that combines the protective and thermal qualities of a ski jacket with additional functional benefits. Such an innovation would not only simplify the process for parents but also enhance the safety and comfort of young skiers, providing a more efficient and user-friendly experience on the slopes.

SUMMARY

In one embodiment, the disclosure includes an article of apparel for lift assistance, comprising a jacket body and an integrated harness system positioned within and secured to the jacket body. The integrated harness system comprises a belt strap configured to extend around a waist area of the jacket body, the belt strap comprising a closure mechanism that extends outside of the jacket body such that the closure mechanism is accessible from a front side of the jacket body; a pair of shoulder straps coupled to the belt strap and configured to extend over the shoulders of a wearer; and a rear strap coupled to the shoulder straps and extending across a back of the jacket body, the rear strap comprising an inside portion that extends inside of the jacket body and an exposed portion that extends outside of the jacket body to define a handle for facilitating lift assistance.

In another embodiment, the article of apparel further comprises a pair of cross straps that are secured to and extend between the pair of shoulder straps across the back, the pair of cross straps intersecting with each other at a vertical position that is between the belt strap and the rear strap. The pair of cross straps may be secured to each other at the location where they intersect, and each of the pair of cross straps may be secured to the belt strap and the rear strap. Each of the pair of shoulder straps extends upward from the belt strap on the front side of the jacket body and downward to the belt strap from the rear side of the jacket body, and the pair of shoulder straps may cross over and intersect with each other on the back side of the jacket body. The integrated harness system may be secured to an interior of the jacket body by stitching, and may further comprise one or more reinforcing panels at one or more locations inside of the jacket body, wherein the integrated harness system is secured to the one or more reinforcing panels.

In a further embodiment, the closure mechanism of the belt strap is a side-release buckle designed for quick and easy fastening and unfastening. The exposed portion of the rear strap comprises a handle member that is coupled to the rear strap. The front side of the jacket body comprises a pair of first openings, and the belt strap extends through the pair of first openings to provide an exposed portion of the belt strap that is outside of the jacket body, and the closure mechanism is on the exposed portion of the belt strap. The rear side of the jacket body comprises a pair of second openings, and the rear strap extends through the pair of second openings to define the exposed portion of the rear strap.

In yet another embodiment, the disclosure includes an article of apparel for lift assistance, comprising a jacket body and an integrated harness system positioned within and secured to the jacket body. The integrated harness system comprises a pair of connected loop straps that are positioned within the jacket such that each loop strap extends around a shoulder portion of the jacket body and circumscribes an arm opening of the jacket body; and a rear strap coupled to the pair of loop straps that extends across a back of the jacket body, the rear strap comprising an inside portion that extends inside of the jacket body and an exposed portion that extends outside of the jacket body to define a handle for facilitating lift assistance.

In a further embodiment, the disclosure includes a method of manufacturing an article of apparel for lift assistance, comprising providing a jacket body having predetermined first and second openings formed in a front side and a rear side, respectively; fabricating an integrated harness system comprising a belt strap configured to extend around a waist area of the jacket body and including a closure mechanism arranged to extend outside of the jacket body; a pair of shoulder straps coupled to the belt strap and configured to extend over the shoulders of a wearer; and a rear strap coupled to the shoulder straps and extending across a back of the jacket body, the rear strap having an inside portion adapted to be secured within the jacket body and an exposed portion adapted to define a handle for facilitating lift assistance. The method further comprises securing the integrated harness system to an interior of the jacket body such that portions of the belt strap and the rear strap extend through the first and second openings, respectively, to provide external access to the closure mechanism of the belt strap and to form the handle for lift assistance of the rear strap. The securing of the integrated harness system to the interior of the jacket body may comprise stitching, and may further comprise securing a handle member to the exposed portion of the rear strap.

These and other features will be more clearly understood from the following detailed description taken in conjunction with the accompanying drawings and claims.

DETAILED DESCRIPTION

Explanation of Terms

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

As used in this disclosure and in the claims, the singular forms "a," "an," and "the" include the plural forms unless the context clearly dictates otherwise. Additionally, the term "includes" means "comprises." Further, the terms "coupled" and "associated" do not exclude the presence of intermediate elements between the coupled or associated items absent specific contrary language.

As used herein, the term "substantially vertical" and "substantially horizontal" refer to an orientation or arrangement that is largely, but not necessarily perfectly, parallel to the horizontal or vertical planes. In practical terms, it means that the component or feature in question is aligned in a manner that approximates a horizontal position, allowing for deviations or inclinations that do not significantly affect its intended function or performance.

As used herein, the term "article of apparel" refers broadly to any piece of clothing or garment that can be worn over the torso, such as a jacket.

As used herein, the term "outside of" a jacket body or other structure refers to an object or structure that is outside of an exterior surface of the jacket body or other structure. As used herein, the term "inside of" a jacket body or other structure refers to an object or structure that is within an exterior surface of the jacket body or other structure. A structure that is inside of a jacket body need not be located at the innermost portions (e.g., such a structure can have additional structures that cover that structure within the jacket body).

For convenience, like reference numbers are used to describe similar components that serve similar functions or have similar structures across in different embodiments.

Embodiments of the Disclosed Technology

Figure 1:
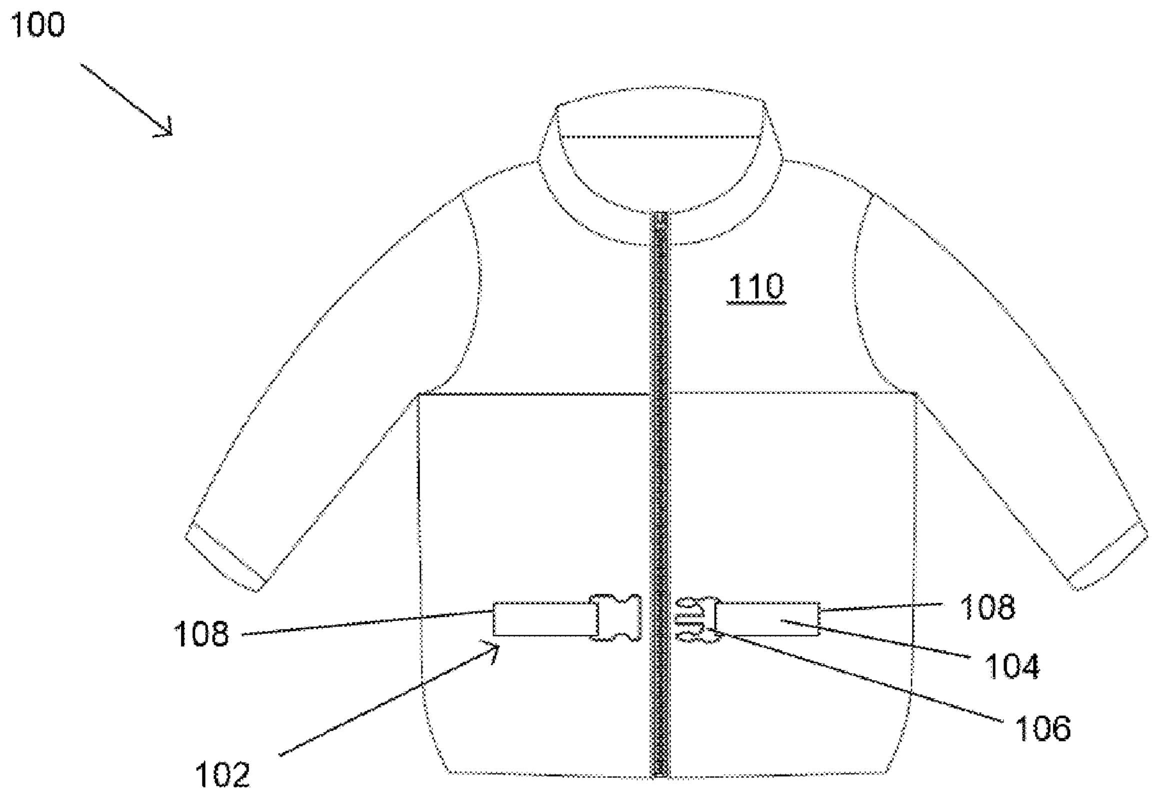
FIG. 1 is a schematic diagram illustrating the integrated harness system within an article of apparel.

FIG. 1 shows a front side view of an article of apparel 100 with an integrated harness system 102. The article of apparel can be a jacket, such as a jacket that is suitable for skiing. As discussed in more detail below, the harness system 102 is integrated into the article 100 to assist in lifting and securing the wearer. As shown in FIG. 1, the harness system 102 includes a belt strap 104 with a closure mechanism 106. A pair of openings 108 in the article 100 allow a portion of the belt strap 104 to extend outside of the article, allowing for easy access to the closure mechanism on a front side 110 of the article 100.

Figure 2:
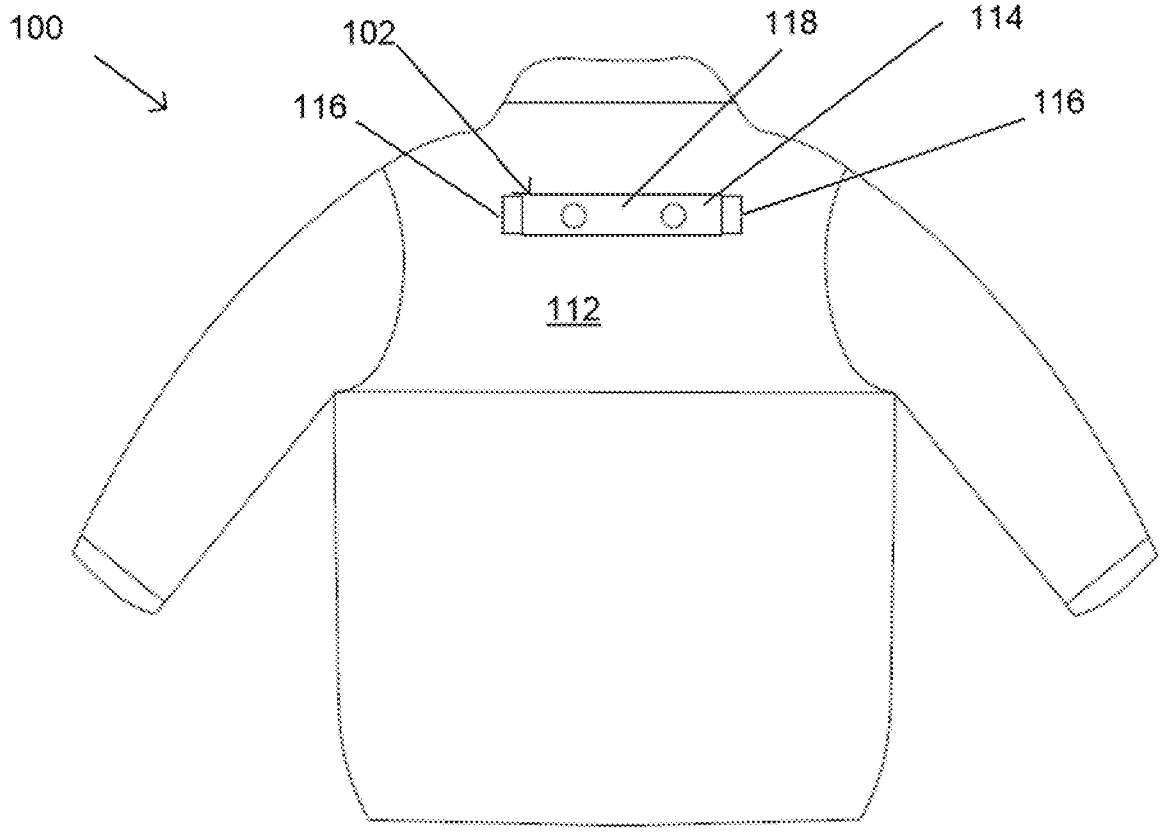
FIG. 2 is a schematic diagram illustrating the rear view of the article with the integrated harness system.

FIG. 2 shows a rear side view of the article 100. A portion of the harness system 102 is visible from the rear side 112 of the article 100, where a rear strap 114 extends through openings 116 in the article 100 to expose a portion of the rear strap 114. Although the rear strap 114 itself can function as a handle, the rear strap 114 can also include an additional handle 118 that is either integrated and/or otherwise attached to the rear strap 114 to provide a convenient grip point for lifting. For example, the handle 118 may be formed from a different material than the rear strap, such as a leather overwrap or a plastic grip.

Figure 3:
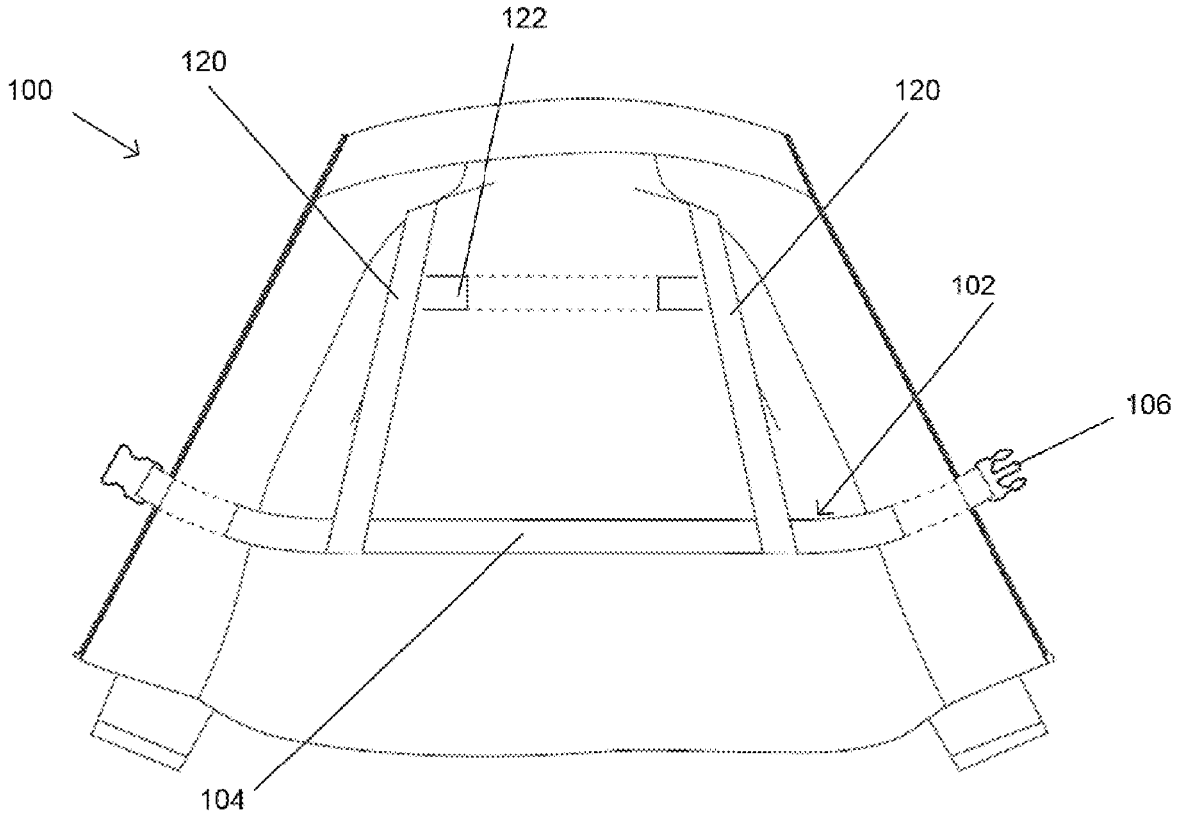
FIG. 3 is a schematic diagram illustrating the integrated harness system within the article of apparel.
Figure 4:
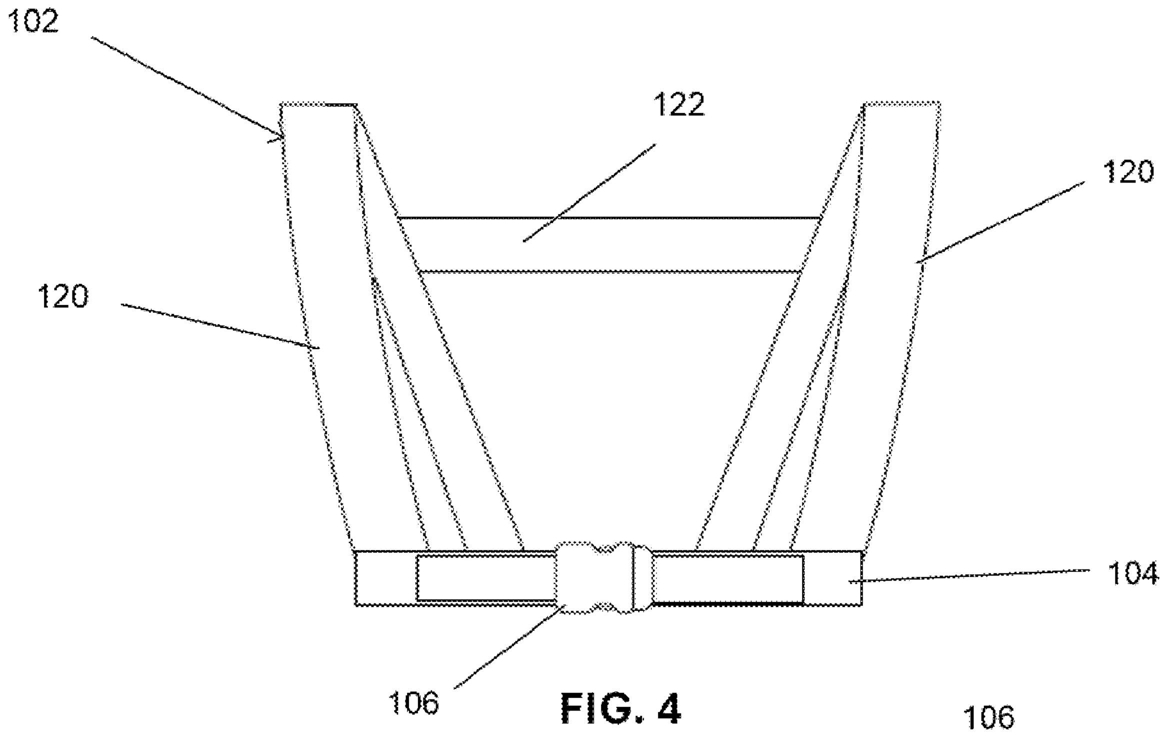
FIG. 4 is a schematic diagram illustrating the harness system of FIG. 3.

FIG. 3 shows the article 100 in an open configuration, with a front zipper opened and the sides of the article are folded back so that the inside of the article can be viewed. FIG. 4 shows the harness system 102 separate from the article to better view the structure of the harness system. As shown in FIG. 3 and FIG. 4, the harness system 102 includes a pair of shoulder straps 120 that are coupled together via the belt strap 104 (at a lower area of the shoulder straps) and a rear strap 122 (at an upper area of the shoulder straps). The shoulder straps 120 extend substantially vertically from the belt strap to wrap over the shoulder of the wearer, while the rear and belt straps extend substantially horizontally between the two shoulder straps.

As shown in FIG. 3, the both the belt strap 104 and the rear strap 122 have exposed portions that extend from the inside of the article 100 to the outside of the article through the openings discussed above. The openings can be any suitable opening in the material of the article through which the straps can pass.

As shown in FIG. 3, the harness system 102 is integrated into the article 100 to provide the structural integrity of the harness in a fully functional article of apparel. The harness system 102 can be secured to the article in any suitable manner that ensures that the harness remains securely attached to the article, even under the forces exerted during lifting.

For example, the harness components, such as the belt strap, shoulder straps, and rear strap, can be stitched directly onto the inner lining of the jacket. Reinforced stitching techniques, such as double stitching, can be employed at critical stress points to enhance durability and prevent tearing. If desired, the areas of the jacket where the harness is attached can be reinforced with additional fabric panels. Such panels can provide extra strength and support, distributing the load more evenly across the jacket material.

FIG. 3 shows the harness exposed on the inside of the article. However, it should be understood that all or some of the harness can be covered on the inside of the article by another layer of fabric. For example, the jacket can be constructed with an outer shell and an inner lining, and the harness components, such as the belt strap, shoulder straps, and rear strap, can be positioned between these two layers and secured to at least the outer shell. A sandwiched construction like this would provide an article of apparel where the harness is less visible from a view of the inside of the jacket, such as the view shown in FIG. 3. Thus, a view showing a harness system concealed by an inner layer would look like FIG. 3, but with the harness system covered by the inner lining.

As shown FIGS. 3 and 4, the belt strap 104 extends around the waist area of the article 100. The belt strap can be adjustable to accommodate different sizes and desired tightness. As discussed above, the belt strap 104 includes a closure mechanism 106, which allows for easy fastening and unfastening of the harness system 102 in front of the wearer. The closure system can be, for example, a side-release buckle, as shown in FIG. 3, or any other suitable closure system.

Figure 5:
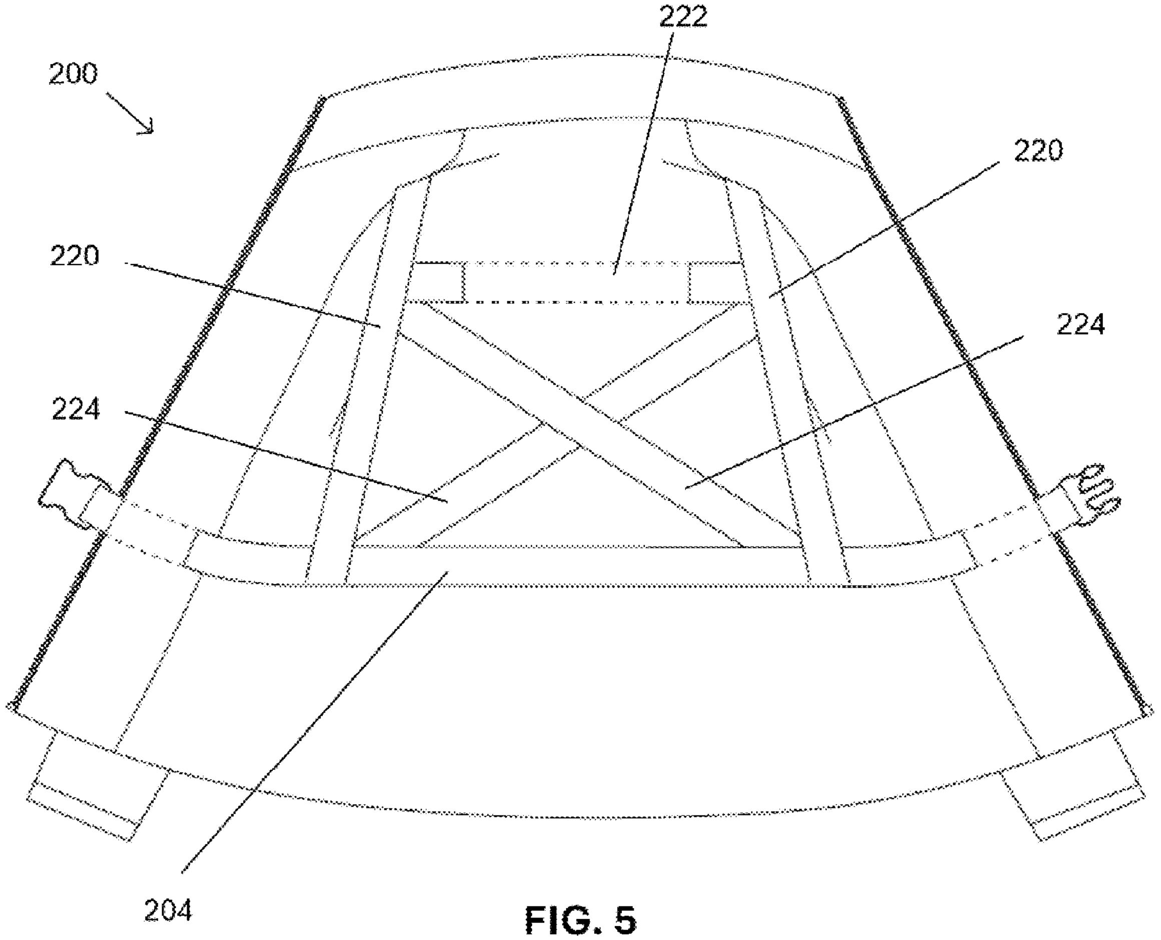
FIG. 5 illustrates a schematic diagram of an integrated harness within an article of apparel.
Figure 6:
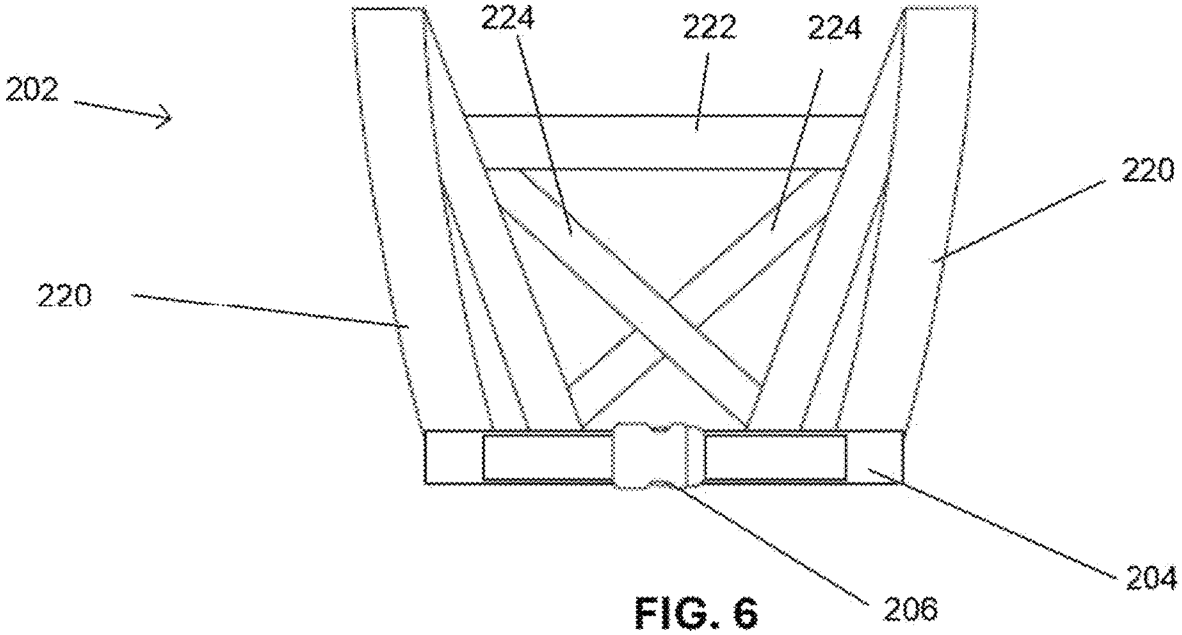
FIG. 6 is a schematic diagram illustrating the harness system of FIG. 5.

FIGS. 5 and 6 illustrate another embodiment of an integrated harness system 202 for use with an article 200. Harness system 202 is similar to harness system 102 described above and has a pair of shoulder straps 220 coupled by a belt strap 204 and a rear strap 222. In addition, harness system 202 includes a pair of cross straps 224 that interconnect the shoulder straps and/or the belt strap and rear strap. The cross straps 224 can provide additional support that reduces the concentration of force on any single point and can provide enhanced stability to prevent twisting of the harness structure when a force is applied.

Figure 7:
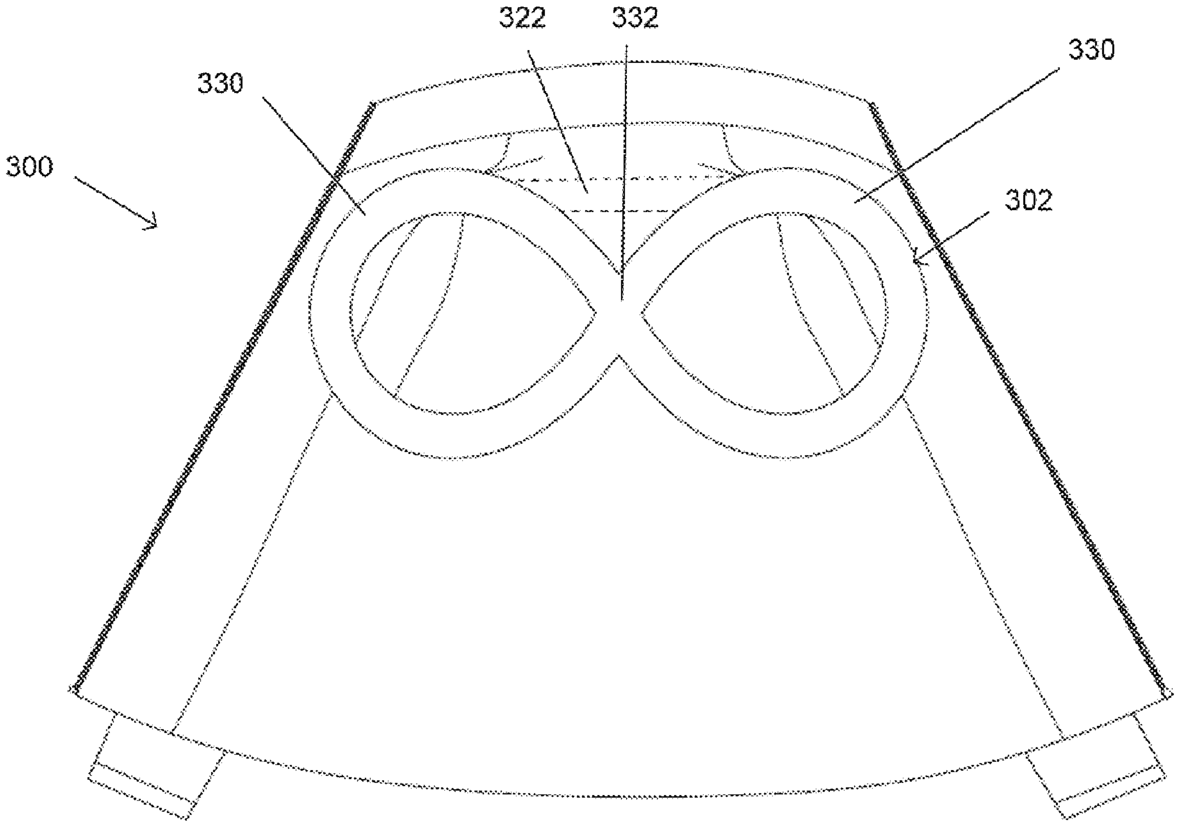
FIG. 7 is a schematic diagram illustrating the integrated harness system within an article of apparel.
Figure 8:
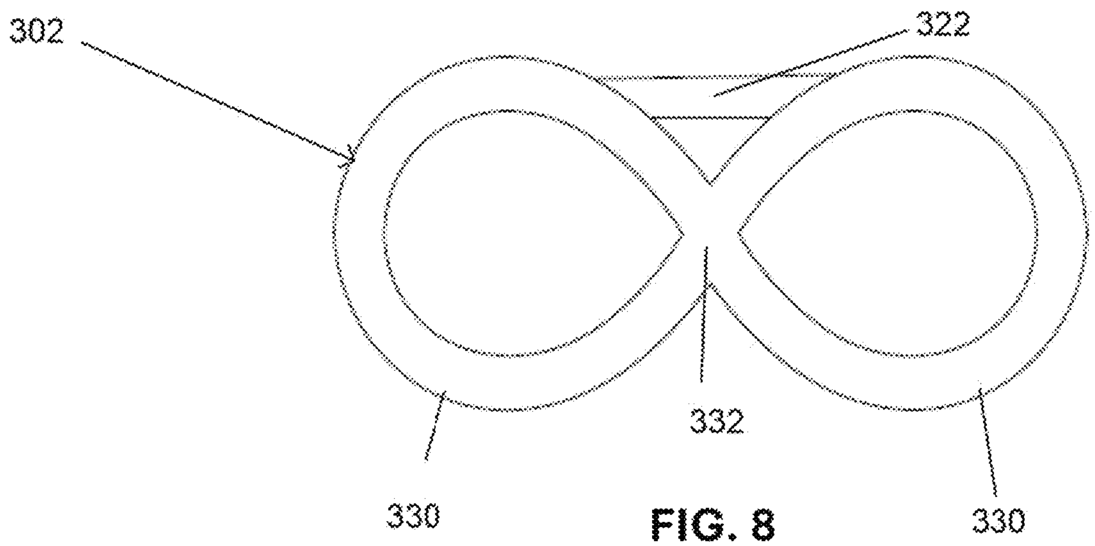
FIG. 8 is a schematic diagram illustrating the harness system of FIG. 7.

FIGS. 7 and 8 illustrate another embodiment of an article 300 with an integrated harness system 302. Like the other embodiments, harness system 302 includes a rear strap 322 that has an exposed portion that serves as handle, or as support for a handle. However, unlike the other embodiments, harness system 302 does not include a belt strap or shoulder straps as described above. Instead, the harness system 302 includes a pair of loop strap 330 that are positioned so that each loop extends around the upper arm and/or shoulder region of a wearer. The two loop straps have a central connection 332 that links the loop straps 330 together. During use, a wearer extends their arms into the sleeves so that each arm extends through one of the loop straps 330. In this manner, the loops straps naturally fall in place over the shoulders to provide a supportive structure that extends across the back of the wearer.

Figure 9:
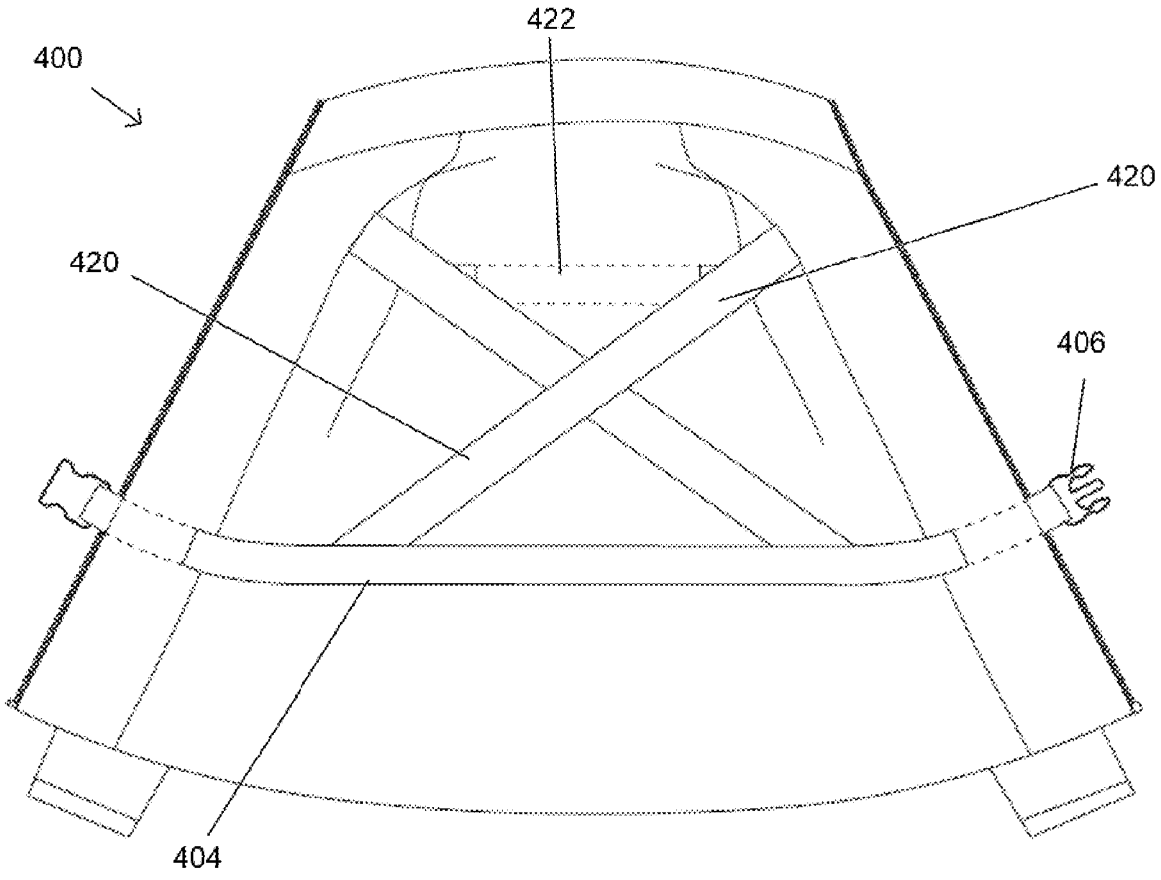
FIG. 9 is a schematic diagram illustrating the integrated harness system within an article of apparel.
Figure 10:
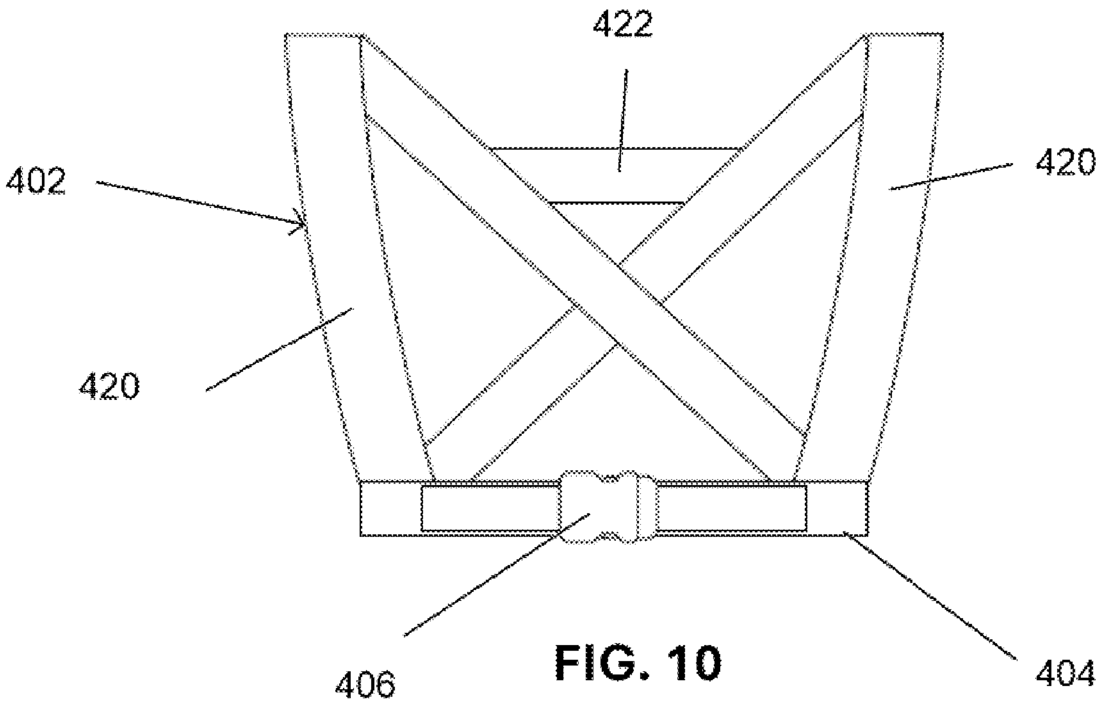
FIG. 10 is a schematic diagram illustrating the harness system of FIG. 9.

FIGS. 9 and 10 illustrate another embodiment of an integrated harness system 402 for use with an article 400. Harness system 402 is similar to harness system 102 described above and has a pair of shoulder straps 420 coupled by a belt strap 404 and a rear strap 422. However, unlike harness system 102, harness system 402 has shoulder straps that attach to different sides of the belt strap 404. That is, the front side of each shoulder strap extends upward over a respective shoulder and then extend across back of the article 400 to connect to the belt strap on the other side of the article. In this manner, the shoulder straps cross over each other in the rear of the article, which provides additional strength from lateral movement of the harness system. In addition, the crossing of the shoulder straps provides another point of connection between the shoulder straps, which allows the shoulder straps to be secured together at another location (i.e., at the intersection of the two straps).

Although primarily described herein as being beneficial as a lifting aid for parents with young children on chair lifts, it should be understood that the integrated harness system can provide significant utility in other situations for parents or caretakers where control and/or safety of children is desired. For example, in the same skiing environment, it can be useful as an aid for lifting or assisting children who have fallen while skiing or who require assistance getting to or from a skiing location. Outside of the skiing environment, the integrated harness can provide utility and convenience in situations, such as crowded areas and busy streets, where control is necessary for safety reasons, as well as in other sporting activities, where lifting assistance is useful to aid in training or learning new skills, such as, for example, cycling, rollerskating/rollerblading, and ice skating. In short, the integrated harness system enhances the functionality of the apparel by providing parents with a versatile tool for providing lifting assistance in a variety of different activities and situations.

The features described herein with regard to any example can be combined with other features described in any one or more of the other examples, unless otherwise stated. In view of the many possible ways in which the principles of the disclosure may be applied, it should be recognized that the illustrated configurations depict examples of the disclosed technology and should not be taken as limiting the scope of the disclosure nor the claims. Rather, the scope of the claimed subject matter is defined by the following claims and their equivalents.

The invention claimed is:

1. An article of apparel for lift assistance, comprising:

a jacket body, wherein the jacket body is a ski jacket and comprises an outer shell and an inner lining;

an integrated harness system positioned between the outer shell and the inner lining and secured to at least the outer shell of the jacket body, the integrated harness system comprising:

a belt strap configured to extend around a waist area of the jacket body, wherein a front side of the jacket body comprises a pair of first openings, and the belt strap extends through the pair of first openings to provide an exposed portion of the belt strap that is outside of the jacket body, the exposed portion of the belt strap comprising a side-release buckle configured for fastening and unfastening and that is accessible from the front side of the jacket body;

a pair of shoulder straps coupled to the belt strap and configured to extend over shoulders of a wearer;

a rear strap coupled to the pair of shoulder straps and extending across a rear side of the jacket body, the rear strap comprising an inside portion that extends inside of the jacket body and an exposed portion that extends outside of the jacket body to define a handle for facilitating lift assistance, wherein the rear side of the jacket body comprises a pair of second openings, and the rear strap extends through the pair of second openings to define the exposed portion of the rear strap; and a pair of cross straps that interconnect the pair of shoulder straps, the belt strap, and the rear strap, the pair of cross straps being secured to and extending between the pair of shoulder straps across the rear side of the jacket body, the pair of cross straps intersecting with each other at a vertical position that is between the belt strap and the rear strap, wherein the pair of cross straps are secured to each other at the vertical position where the pair of cross straps intersect with each other, and each of the pair of cross straps is secured to the belt strap and the rear strap.

2. The article of apparel of claim 1, wherein each of the pair of shoulder straps extends upward from the belt strap on the front side of the jacket body and downward to the belt strap from the rear side of the jacket body.

3. The article of apparel of claim 1, wherein the integrated harness system is secured to at least the outer shell of the jacket body by stitching.

4. The article of apparel of claim 1, wherein a closure mechanism of the belt strap is the side-release buckle.

5. The article of apparel of claim 1, wherein the handle comprises a gripping member that extends around the handle.

6. The article of apparel of claim 1, wherein the belt strap is adjustable.

7. The article of apparel of claim 1, wherein the integrated harness system is secured to the jacket body by reinforced stitching.

8. The article of apparel of claim 7, wherein the reinforced stitching comprises double stitching.

9. The article of apparel of claim 1, wherein the handle comprises a grip formed from a material different from a material of the rear strap.

* * * * *